United States Patent
Lindoff et al.

(10) Patent No.: US 9,942,810 B2
(45) Date of Patent: Apr. 10, 2018

(54) CONNECTION SETUP FOR HETEROGENEOUS CELLULAR COMMUNICATION NETWORKS

(71) Applicant: Telefonaktiebolaget L M Ericsson (publ), Stockholm (SE)

(72) Inventors: Bengt Lindoff, Bjarred (SE); Joakim Axmon, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 149 days.

(21) Appl. No.: 14/892,142

(22) PCT Filed: May 20, 2013

(86) PCT No.: PCT/EP2013/060325
§ 371 (c)(1),
(2) Date: Nov. 18, 2015

(87) PCT Pub. No.: WO2014/187468
PCT Pub. Date: Nov. 27, 2014

(65) Prior Publication Data
US 2016/0095030 A1    Mar. 31, 2016

(51) Int. Cl.
*H04W 36/04* (2009.01)
*H04W 36/00* (2009.01)
(Continued)

(52) U.S. Cl.
CPC .......... *H04W 36/04* (2013.01); *H04B 17/318* (2015.01); *H04W 36/0061* (2013.01);
(Continued)

(58) Field of Classification Search
CPC  H04B 17/318; H04W 16/32; H04W 36/0061; H04W 36/04; H04W 36/30;
(Continued)

(56) References Cited

U.S. PATENT DOCUMENTS

| 8,934,456 B2* | 1/2015 | Novak | H04W 76/02 |
| | | | 370/332 |
| 9,060,328 B2* | 6/2015 | Marinier | H04W 36/22 |

(Continued)

FOREIGN PATENT DOCUMENTS

| KR | 20120110841 A | 10/2012 |
| KR | 20120111248 A | 10/2012 |

(Continued)

OTHER PUBLICATIONS

PCT International Search Report, dated Jan. 30, 2014, in connection with International Application No. PCT/EP2013/060325, all pages.

(Continued)

*Primary Examiner* — Kashif Siddiqui
(74) *Attorney, Agent, or Firm* — Laffler Intellectual Property Law, PLLC

(57) ABSTRACT

A connection setup method of a wireless communication device adapted to be operated in a heterogeneous cellular communication network is disclosed. The heterogeneous cellular communication network comprises at least a first cell and a second cell, respectively associated with a first cell layer and a second cell layer of the heterogeneous cellular communication network. The wireless communication device is adapted to use a serving cell associated with the first cell layer or the second cell layer when the wireless communication device is in an active mode, and to use a camping cell associated with the first cell layer when the wireless communication device is in an idle mode. The method comprises detecting, when the wireless communication device is in the active mode and uses the second cell as the serving cell, that the serving cell is associated with the second cell layer. In response to detecting an upcoming transfer to the idle mode, the method comprises storing connection setup parameters of the second cell and transferring to the idle mode, wherein transferring comprises (Continued)

selecting the first cell as the camping cell. The method also comprises, when the wireless communication device is in the idle mode, detecting an upcoming transfer to the active mode and transferring to the active mode, wherein transferring comprises setting up a connection to a cell of the heterogeneous cellular communication network based on the stored connection setup parameters of the second cell. Corresponding computer program product, arrangement and wireless communication device are also disclosed.

17 Claims, 4 Drawing Sheets

(51) Int. Cl.
  *H04W 36/32* (2009.01)
  *H04W 52/02* (2009.01)
  *H04W 36/30* (2009.01)
  *H04W 48/16* (2009.01)
  *H04B 17/318* (2015.01)
  *H04W 16/32* (2009.01)

(52) U.S. Cl.
  CPC .......... *H04W 36/30* (2013.01); *H04W 36/32* (2013.01); *H04W 48/16* (2013.01); *H04W 52/028* (2013.01); *H04W 16/32* (2013.01); *Y02B 60/50* (2013.01)

(58) Field of Classification Search
  CPC ... H04W 36/32; H04W 48/16; H04W 52/028; Y02B 60/50
  See application file for complete search history.

(56) References Cited

U.S. PATENT DOCUMENTS

| | | | | |
|---|---|---|---|---|
| 9,307,460 | B2* | 4/2016 | Palenius | H04W 36/0061 |
| 9,374,769 | B2* | 6/2016 | Kherani | H04W 48/16 |
| 9,615,316 | B2* | 4/2017 | Cherian | H04W 52/228 |
| 2006/0215609 | A1* | 9/2006 | Kyung | H04W 48/20 370/331 |
| 2011/0250892 | A1 | 10/2011 | Gupta et al. | |
| 2014/0334371 | A1* | 11/2014 | Kim | H04W 52/0206 370/311 |
| 2016/0050598 | A1* | 2/2016 | Dalsgaard | H04W 36/0055 370/331 |

FOREIGN PATENT DOCUMENTS

| | | |
|---|---|---|
| WO | 2010126344 A2 | 11/2010 |
| WO | 2011075689 A1 | 6/2011 |
| WO | 2011137932 A1 | 11/2011 |
| WO | 2012008957 A1 | 1/2012 |
| WO | 2012072147 A1 | 6/2012 |
| WO | 2012142436 A1 | 10/2012 |

OTHER PUBLICATIONS

PCT Written Opinion, dated Jan. 30, 2014, in connection with International Application No. PCT/EP2013/060325, all pages.
Pablo Munoz et al, Mobility-based strategies for traffic steering in heterogeneous networks, IEEE Communications Magazine, vol. 51, No. 5, May 13, 2013, Piscataway, US, pp. 54-62.
Ericsson et al., 3GPP TSG-RNA WG2 #81bis, Frequent handovers and signaling load aspects in heterogeneous networks, Chicago, USA, Apr. 15-19, 2013, 6 pages.
Fujitsu, 3GPP TSG RAN WG2 Meeting #81bis, Views on how to down select solutions for improving overall HO performance, Chicago, USA, Apr. 15-19, 2014, 6 pages.
B. Wang et al., Performance Analysis of HSPA Multi-Carrier Heterogeneous Networks, 2012 IEEE, pp. 1-5.
M. Shirakabe et al., Performance Evaluation of Inter-cell Interference Coordination and Cell Range Expansion in Heterogeneous Networks for LTE-Advanced Downlink, 2011 8th International Symposium on Wireless Communication Systems, Aachen, pp. 844-848.

* cited by examiner

CONNECTION SETUP FOR HETEROGENEOUS CELLULAR COMMUNICATION NETWORKS

TECHNICAL FIELD

The present invention relates generally to the field of heterogeneous communication networks. More particularly, it relates to connection setup for a wireless communication device operating in a heterogeneous communication network.

BACKGROUND

Heterogeneous cellular communication networks (e.g. as specified by the Third Generation Partnership Project, Long Term Evolution—3GPP LTE) typically deploy a mixture of cells of differently sized and overlapping coverage areas. The larger cells are typically handled by high power nodes and the smaller cells are typically handled by low power nodes. The high power nodes may, for example, be traditional cellular communication nodes (e.g. macro nodes). Some examples of low power nodes in heterogeneous communication networks include pico nodes, home base stations (femto nodes), and relays. The various types of cells are organized into two or more cell layers of the heterogeneous network. Terminology from 3GPP LTE specifications and implementations will be used throughout this disclosure for illustrative purposes. This is not to be considered limiting. Contrarily, the description herein may be equally applicable to other suitable scenarios, e.g. based on WCDMA (wideband code division multiple access), HSPA (high speed packet access), GSM (global system for mobile communication), EDGE (enhanced data rate for GSM evolution), etc.

A simple example of a heterogeneous network deployment is illustrated in FIGS. 1A-C, where two neighboring macro cells 31, 41 and a pico cell 21 deployed within the coverage area of the macro cell 31 are shown.

One aim of deploying low power nodes, such as pico nodes, within the coverage area of a macro cell is to improve system capacity via cell splitting gain. Another aim is to provide very high speed data access to end users throughout the network or at least in selected areas. Heterogeneous network deployments are particularly effective for providing service in traffic hotspots, i.e. small geographical areas with high user density. In a heterogeneous network deployment, traffic hotspots may be served by, for example, pico cells. Thus, heterogeneous network deployments represent an alternative to a denser macro network deployment.

Because of the, sometimes substantial, difference in output power between high power nodes and low power nodes (e.g. 46 dBm for macro cells and less than 30 dBm for pico cells in an example scenario), the interference situation in heterogeneous networks typically differs from that of a traditional one-layer cellular communication network where all base stations have the same or similar output power.

The communication associated with the various layers of a heterogeneous network need to be separated so that a manageable interference situation may be provided. Such separation may, for example, be provided via frequency separation or via resource coordination.

In the frequency separation approach, nodes that serve cells associated with different layers of the heterogeneous network operate on different and non-overlapping carrier frequencies. Thereby, interference between the layers is avoided. With no higher (e.g. macro) layer cell interference towards the lower (e.g. pico) layer cells, cell splitting gain is achieved when all communication resources are used by the lower layer cells. Generally, when referred to herein, the higher and lower layer cells may be as defined according to any relevant known or future heterogeneous network terminology. For example, the higher layer cell may be a macro cell and the lower layer cell may be a pico or femto cell. Other relevant examples of a higher layer cell include an aggressor cell (e.g. as used in 3GPP specifications) and a source cell. Other relevant examples of a lower layer cell include a victim cell (e.g. as used in 3GPP specifications), a hotspot cell and a target cell One drawback of frequency separation is that it may lead to inefficient resource utilization due to that the split of carrier frequencies between layers is typically done in a static manner. For example, when there are low traffic amounts in the lower layer cells located in the coverage area of a higher layer cell, it might be more efficient to use all available carrier frequencies in the higher layer cell and basically switch off the lower layer cells. Such an approach would, however, not be possible due to the static carrier frequency assignment.

In the resource coordination approach, radio resources of one or more carrier frequencies may be shared between layers by cross-layer coordination of transmissions, wherein some radio resources (e.g. some resource blocks of 3GPP LTE) are allocated to a higher layer cell during a time period while the remaining available radio resources may be accessed by the lower layer cells without interference from the higher layer cell. This type of coordination may be referred to as inter-cell interference coordination (ICIC). Depending on the traffic situation across the layers, the resource split may change dynamically over time to accommodate different traffic demands. Efficient application of ICIC requires time synchronization between base station nodes.

A wireless communication device (sometimes simply referred to as a device herein) typically has to perform a number of measurement and synchronization operations before it can connect to or communicate with a cellular communication network. Using 3GPP LTE as an example, the wireless communication device typically first performs a cell search where it may find and acquire synchronization to one or more cells within the network. Then, information needed to communicate with and operate properly within one of the cells is typically received and decoded, and the cell may be accessed using the so-called random-access procedure. This type of procedures are typically performed at power up of the wireless communication device, but also throughout the operation of the device to support mobility and/or changing radio conditions.

For a decision regarding which cell the wireless communication device should use (e.g. decision by the network to perform handover for terminals in active mode, and decision by the device cell to perform re-selection for terminals in idle mode), an estimation of communication quality of the cells at hand is typically applied. Such a decision may be based on the received power of each of the cells under consideration, on the path loss of each of the cells under consideration, or a combination. A situation where the decision differs depending on which of the above measures is applied is referred to as a link imbalance situation and is quite typical for heterogeneous networks due to the difference in output powers between the nodes of different layers, and ICIC would typically be particularly beneficial in a region where a lower layer cell is used even though a higher layer cell offers a stronger received power.

In a typical communication standard supporting heterogeneous network deployments (e.g. 3GPP LTE), some or all heterogeneous network procedures for a wireless communication device may only be defined when the device is in an active mode. Thus, searching for low power (e.g. target, hotspot, victim, etc.) node signals (which may be drowned by high power (e.g. source, macro, aggressor, etc.) node signals) to find lower layer cells and/or performing measurements according to a restricted measurement pattern may be performed only in active mode. Hence, when a device is in an idle mode it typically cannot camp on a lower layer cell if not the difference in received power between higher layer cells and the lower layer cell is small (e.g. 6 dB in 3GPP LTE).

Thus, a wireless communication device that is served by a low power node in active mode typically changes to camping on a cell provided by a high power node when transferring to idle mode. When entering active mode again, the device typically uses the camping cell as serving cell (i.e. sets up a connection to the high power node). Once in active mode, the device will be subject to heterogeneous network procedures again and will eventually be subject to handover to the lower layer cell of the low power node (if the device is still within reach of the low power node). This cell switching will create some overhead signaling between the device and the network as well as in the network backhaul between lower and higher layers (e.g. over the X2 interface of 3GPP LTE). The problem with overhead signaling will be particularly detrimental in situations with frequent mode changes of devices, which becomes more prominent with the increasing use—for example in smartphones—of various applications that frequently access the network (i.e. to check for content updates or similar).

This may be partly solved by letting the device stay in active mode with discontinuous reception (DRX). Such a solution, however, requires more network and radio resources than the idle mode and is not preferable (except maybe for an initial phase of, for example, between 1 and 60 seconds, before transferring to idle mode).

Therefore, there is a need for methods and arrangements that overcome at least some of the problems related to frequent mode transitions of wireless communication devices in a heterogeneous network.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements for wireless communication devices in a heterogeneous network.

According to a first aspect, this is achieved by a connection setup method of a wireless communication device adapted to be operated in a heterogeneous cellular communication network. The connection setup method may be implemented by the wireless communication device.

The heterogeneous cellular communication network comprises at least a first cell and a second cell, the first and second cell being respectively associated with a first cell layer and a second cell layer of the heterogeneous cellular communication network. The wireless communication device is adapted to use a serving cell associated with the first cell layer or the second cell layer when the wireless communication device is in an active mode, and to use a camping cell associated with the first cell layer when the wireless communication device is in an idle mode.

The method comprises detecting, when the wireless communication device is in the active mode and uses the second cell as the serving cell, that the serving cell is associated with the second cell layer, detecting an upcoming transfer to the idle mode, and storing connection setup parameters of the second cell in response to detecting the upcoming transfer to the idle mode.

The method further comprises transferring to the idle mode (wherein transferring comprises selecting the first cell as the camping cell), detecting an upcoming transfer to the active mode, and transferring to the active mode (wherein transferring comprises setting up a connection to a cell of the heterogeneous cellular communication network based on the stored connection setup parameters of the second cell).

The active mode may, for example, be a connected mode (e.g. RRC_CONNECTED of 3GPP LTE including applicable states such as CELL_DCH, etc.).

According to some embodiments, detecting (when the wireless communication device is in the active mode and uses the second cell as the serving cell) that the serving cell is associated with the second cell layer may further comprise detecting that the wireless communication device is in a link imbalance zone as defined later herein.

In some embodiments, the heterogeneous cellular communication network applies inter-cell interference coordination, wherein the first and second cell may use different radio resources on a same carrier frequency.

According to some embodiments, detection of an upcoming transfer to the active or idle mode may comprise a physical layer of the wireless communication device receiving a mode change indication from a higher operational layer (e.g. a layer 3 of the operational system interconnection model) of the wireless communication device.

In some embodiments, the connection setup parameters may comprise one or more of: cell configuration parameters and random access parameters. For example, the connection setup parameters may comprise one or more of: a carrier frequency, a cell identity (e.g. physical cell identity), one or more random access channel (RACH) signatures, and one or more random access channel (RACH) timing parameters. One or more of the connection setup parameters may be read from a master information block (MIB) and/or a system information block (e.g. SIB1, SIB2).

According to some embodiments, setting up a connection to the cell of the heterogeneous cellular communication network based on the stored connection setup parameters of the second cell may comprise connecting to the second cell as the serving cell using the stored connection setup parameters of the second cell.

According to some embodiments, setting up the connection to the cell of the heterogeneous cellular communication network based on the stored connection setup parameters of the second cell may comprise determining if (i.e. whether) a non-mobility condition is fulfilled, connecting to the second cell as the serving cell using the stored connection setup parameters of the second cell if the non-mobility condition is fulfilled (i.e. in response to the non-mobility condition being fulfilled), and connecting to a cell associated with the first cell layer as the serving cell if the non-mobility condition is not fulfilled (i.e. in response to the non-mobility condition not being fulfilled). The cell associated with the first cell layer may be the camping cell.

Connecting to a cell associated with the first cell layer as the serving cell may comprise connecting to the first cell as the serving cell. This may be applicable, for example, if the first cell is the camping cell.

Connecting to a cell associated with the first cell layer as the serving cell may comprise connecting to a third cell as the serving cell, wherein the third cell is associated with the first cell layer. This may be applicable, for example, if the method further comprises (after transferring to the idle mode and before transferring to the active mode) performing re-selection from the first cell to the third cell as the camping cell.

Determining if a non-mobility condition is fulfilled may, according to some embodiments, comprise at least one of determining if no cell re-selection has been made after transferring to the idle mode and before transferring to the active mode, determining if a signal strength value of the second cell is above a signal strength threshold, determining if a difference between first and second signal strength values of the first cell is below a signal strength difference threshold (the first and second signal strength values measured at different time instants after transferring to the idle mode and before transferring to the active mode), and determining if a difference between first and second location indications of the wireless communication device is below a location indication difference threshold (the first and second location indications associated with different time instants after transferring to the idle mode and before transferring to the active mode).

Detecting that the serving cell is associated with the second cell layer when the wireless communication device is in the active mode and uses the second cell as the serving cell may, according to some embodiments, comprise at least one of: detecting that the wireless communication device is configured with a restricted measurement pattern, detecting that a current signal strength value of the second cell is below a current signal strength value of a strongest cell associated with the first cell layer, receiving a heterogeneous network scenario indication from the second cell, and detecting that a current location indication is comprised among stored location indications associated with a heterogeneous network scenario.

In some embodiments, the method may further comprise, after transferring to the idle mode and before transferring to the active mode, performing measurements on the second cell. The measurements may comprise one or more of synchronization measurements (e.g. cell timing measurements), signal strength measurements (e.g. reference signal received power—RSRP—measurements), and signal quality measurements (e.g. reference signal received quality—RSRQ—measurements).

A second aspect is a connection setup method of a wireless communication device adapted to be operated in a heterogeneous cellular communication network. The heterogeneous cellular communication network comprises at least a first cell and a second cell, the first and second cell being respectively associated with a first cell layer and a second cell layer of the heterogeneous cellular communication network. The wireless communication device is adapted to use a serving cell associated with the first cell layer or the second cell layer when the wireless communication device is in an active mode, and to use a camping cell associated with the first cell layer when the wireless communication device is in an idle mode.

The method comprises detecting, when the wireless communication device is in the idle mode and uses the first cell as the camping cell, an upcoming transfer to the active mode, determining if (i.e. whether) connection setup parameters of the second cell are stored, and transferring to the active mode. Transferring comprises connecting to the second cell as the serving cell using the stored connection setup parameters of the second cell if connection setup parameters of the second cell are stored (i.e. in response to connection setup parameters of the second cell being stored), and connecting to the first cell as the serving cell otherwise.

According to some embodiments, the method further comprises (before detecting the upcoming transfer to the active mode) receiving a heterogeneous network instruction message from a cell of the heterogeneous cellular communication network (the heterogeneous network instruction message comprising connection setup parameters of the second cell) and storing the connection setup parameters of the second cell. The cell of the heterogeneous cellular communication network may, for example, be the camping cell.

A third aspect is a computer program product comprising a computer readable medium, having thereon a computer program comprising program instructions, the computer program being loadable into a data-processing unit and adapted to cause the data-processing unit to execute method steps according to the first or second aspect when the computer program is run by the data-processing unit.

According to a fourth aspect, a connection setup arrangement of a wireless communication device is provided, wherein the wireless communication device is adapted to be operated in a heterogeneous cellular communication network. The heterogeneous cellular communication network comprises at least a first cell and a second cell, the first and second cell being respectively associated with a first cell layer and a second cell layer of the heterogeneous cellular communication network. The wireless communication device is adapted to use a serving cell associated with the first cell layer or the second cell layer when the wireless communication device is in an active mode, and to use a camping cell associated with the first cell layer when the wireless communication device is in an idle mode.

The arrangement comprises a controller, a mode detector, a storage unit, and a cell management unit. The mode detector is adapted to detect an upcoming transfer to the idle mode and to detect an upcoming transfer to the active mode.

The controller is adapted to detect, when the wireless communication device is in the active mode and use the second cell as the serving cell, that the serving cell is associated with the second cell layer. The controller is also adapted to, when it has detected that the serving cell is associated with the second cell layer, cause the storage unit to store connection setup parameters of the second cell in response to the mode detector detecting the upcoming transfer to the idle mode. Furthermore, the controller is adapted to cause the wireless communication device to transfer to the idle mode in response to the mode detector detecting the upcoming transfer to the idle mode, wherein transferring comprises the cell management unit selecting the first cell as the camping cell. The controller is also adapted to cause the wireless communication device to transfer to the active mode in response to the mode detector detecting the upcoming transfer to the active mode, wherein transferring comprises setting up a connection to a cell of the heterogeneous cellular communication network based on the stored connection setup parameters of the second cell.

In some embodiments, the controller may be further adapted to, when causing the wireless communication device to transfer to the active mode, determine if a non-mobility condition is fulfilled, cause the cell management unit to select the first cell as the serving cell if the non-mobility condition is fulfilled, and cause cell management unit to select a cell associated with the first cell layer as the serving cell if the non-mobility condition is not fulfilled.

The arrangement may, according to some embodiments, further comprise a signal strength measurement unit adapted to measure signal strengths of at least one of the first and second cell. The controller may be adapted to determine if a non-mobility condition is fulfilled by determining at least one of if a signal strength value of the second cell is above a signal strength threshold, and if a difference between first and second signal strength values of the first cell is below a signal strength difference threshold, the first and second signal strength values measured at different time instants after transferring to the idle mode and before transferring to the active mode.

The arrangement may, according to some embodiments, further comprise a positioning unit adapted to provide first and second location indicators of the wireless communication device. The controller may be adapted to determine if a non-mobility condition is fulfilled by determining if a difference between the first and second location indications is below a location indication difference threshold, the first and second location indications associated with different time instants after transferring to the idle mode and before transferring to the active mode.

In some embodiments, the controller may be adapted to determine if a non-mobility condition is fulfilled by determining if no cell re-selection has been made after transferring to the idle mode and before transferring to the active mode.

A fifth aspect is a wireless communication device comprising the arrangement of the fourth aspect.

In some embodiments, the second, third, fourth and fifth aspects may additionally have features identical with or corresponding to any of the various features as explained above for the first aspect.

An advantage of some embodiments is that there may be a decreased amount of switching between higher layer cells (e.g. macro cells, aggressor cells, source cells, etc.) and lower layer cells (e.g. pico cells, victim cells, target cells, etc.) in connection with mode switches of wireless communication devices in heterogeneous network scenarios.

Another advantage of some embodiments is that the amount of signaling related to cell switches (e.g. handovers between higher layer cells and lower layer cells) in heterogeneous network scenarios may be significantly reduced. This in turn may reduce the signaling load on one or more of the backhaul, the radio interface between network nodes and the radio interface between wireless communication devices and network nodes.

Yet another advantage of some embodiments is that when a wireless communication device performs a random access procedure towards a network node that is preferable with regard to transmission power level of the wireless communication device (e.g. towards a nearby pico node in stead of a camped on macro node), the generated interference relevant for up link signaling is decreased.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments for heterogeneous network scenarios will be described where a connection setup initiated by a wireless communication device may be towards a cell that is not a camping cell currently used by the wireless communication device. The embodiments are particularly applicable in scenarios where radio resources of one or more carrier frequencies are shared between layers by cross-layer coordination of transmissions.

Typically, the connection setup is first attempted towards a cell of a lower layer of the heterogeneous network architecture (e.g. a micro cell, a pico cell, a home base station cell, etc.), which cell was used in a previous (e.g. an immediately precedent) active mode session of the wireless communication device. If the connection setup toward the lower layer cell is not successful (after one or more attempts), connection setup towards the camping cell may be attempted as a fallback solution according to some embodiments.

In some embodiments, the connection setup towards the lower layer cell is only attempted if a non-mobility condition is fulfilled. The objective of the non-mobility condition is to determine whether or not it is likely that the wireless communication device is still in the coverage area of the lower layer cell used in the previous active mode session.

Figure 1A:
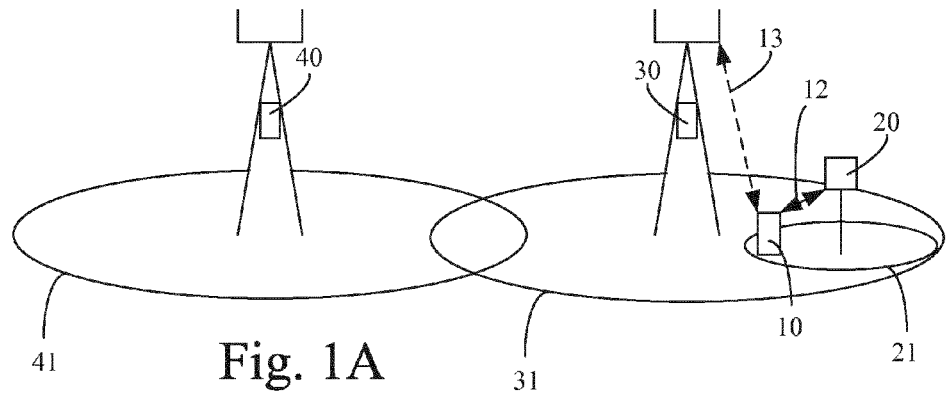
FIGS. 1A, 1B and 1C are schematic drawings illustrating scenarios according to some embodiments for a wireless communication device operating in a heterogeneous communication network.
Figure 1B:
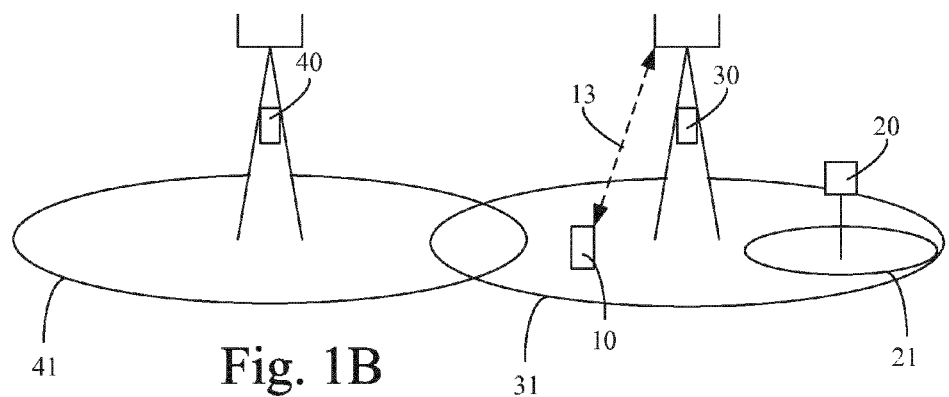
Figure 1C:
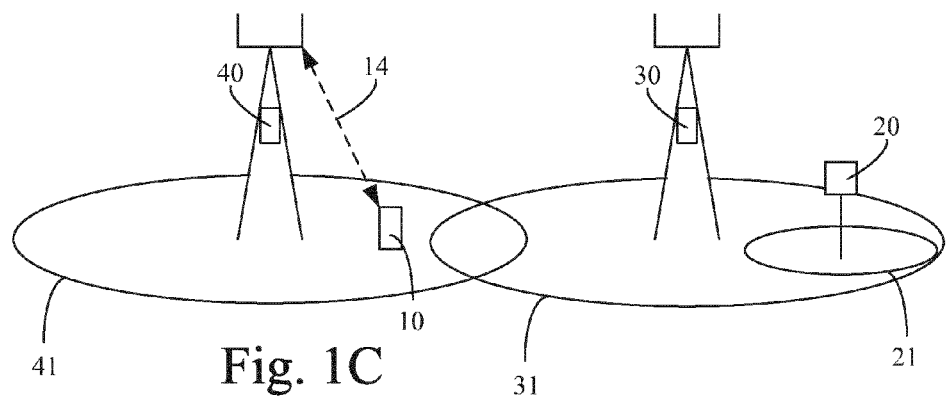

FIGS. 1A, 1B and 1C illustrate example scenarios for a wireless communication device 10 operating in a heterogeneous communication network comprising two higher layer nodes (e.g. macro nodes) 30, 40 and a lower layer node (e.g. pico node) 20. Each of the nodes 20, 30, 40 serves a respective cell having a respective cell coverage area 21, 31, 41. In this example, the cell coverage area 21 of the cell served by the lower layer node 20 is completely within the cell coverage area 31 of the cell served by the higher layer node 30.

In FIG. 1A, the wireless communication device 10 is within the coverage area 21 of the lower layer cell 20 and also within the coverage area 31 of the higher layer cell 30. When the wireless communication device 10 is in active mode, it may communicate with the lower layer node 20 (as illustrated by the arrow 12) or with the higher layer node 30 (as illustrated by the arrow 13). When the wireless communication device 10 is in idle mode, it typically uses the cell of the higher layer node 30 as camping cell. The latter is particularly true if no heterogeneous network procedures are defined for idle mode, in which case the lower layer node 20 may not even be detected by the wireless communication device 10 in idle mode.

In FIG. 1B, the wireless communication device 10 is within the coverage area 31 of the higher layer cell 30. Thus, when the wireless communication device 10 is in active mode, it may communicate with the higher layer node 30 (as illustrated by the arrow 13), and when the wireless communication device 10 is in idle mode, it uses the cell of the higher layer node 30 as camping cell.

In FIG. 1C, the wireless communication device 10 is within the coverage area 41 of the higher layer cell 40. Thus, when the wireless communication device 10 is in active mode, it may communicate with the higher layer node 40 (as illustrated by the arrow 14), and when the wireless communication device 10 is in idle mode, it uses the cell of the higher layer node 40 as camping cell.

With reference to FIG. 1A, if the wireless communication device 10 communicates with the lower layer node 20 in active mode, it may store connection setup parameters related to the lower layer node 20 in association with a transfer to idle mode. At or after transfer to idle mode, the wireless communication device 10 may use the cell of the higher layer node 30 as camping cell (e.g. if the received signal strength of the lower layer node 20 is considerably lower that the received signal strength of the higher layer node 30).

In a conventional approach, the wireless communication device 10 would attempt connection setup to the node of the camping cell (i.e. the higher layer node 30 in this case) when transferring back to active mode, which would typically be followed by a handover to the lower layer node 20 in the scenario illustrated.

According to embodiments described herein, the wireless communication device 10 would in stead attempt connection setup to the lower layer node 20 (using the stored connection setup parameters) when transferring back to active mode, hence avoiding at least some handovers and overhead signaling.

In some embodiments, the connection setup towards the lower layer node 20 is only attempted if a non-mobility condition is fulfilled. Examples of scenarios where this approach may be beneficial are illustrated in FIGS. 1B and 1C, where the wireless communication device 10 has moved after the transfer to idle mode and is no longer in within the coverage area 21 of the lower layer cell 20 when a re-transfer to active mode is imminent. Thus, attempting connection setup towards the lower layer node 20 would not be successful and may be omitted if it may be determined that the wireless communication device 10 is no longer in within the coverage area 21 of the lower layer node 20.

In FIG. 1B, the wireless communication device is still within the coverage area 31 of the higher layer node 30. This situation may, for example, be detected by using the received signal strength of the lower layer node 20 and/or a received signal strength difference between the lower layer node 20 and the higher layer node 30 as a non-mobility condition indicator. Other examples of non-mobility condition indicators that may detect this situation comprise a geographical position value of the wireless communication device 10.

Alternatively or additionally, the time spent in idle mode may be used as a non-mobility condition indicator. Such an approach may or may not detect the situation in FIG. 1B. Yet alternatively or additionally, non-mobility condition indicator may be whether or not a cell re-selection has been performed in the idle mode. Such an approach will typically not detect the situation in FIG. 1B, but will detect the situation in FIG. 1C, where the wireless communication device has performed a cell re-selection and is now within the coverage area 41 of the higher layer node 40.

A combination of the above non-mobility condition indicators and/or other suitable non-mobility condition indicators may be applied according to some embodiments.

Figure 2A:
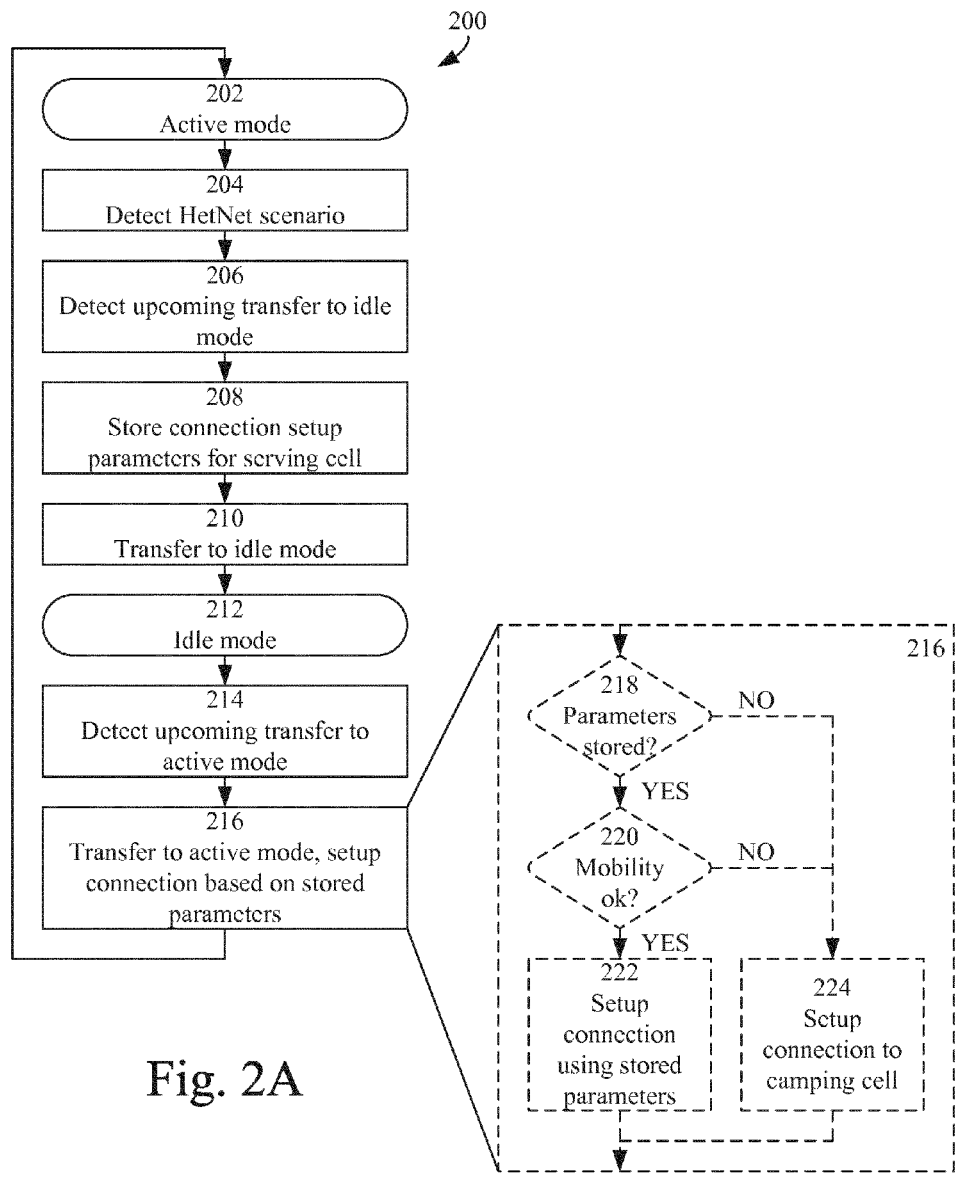
FIG. 2A is a flowchart illustrating example method steps according to some embodiments.

FIG. 2A illustrate an example method 200 of connection setup in heterogeneous network scenarios. A wireless communication device (compare with the wireless communication device 10 of FIGS. 1A, 1B and 1C) may start in either active mode (step 202) or idle mode (212).

When a device in active mode (step 202) detects that it is in an applicable heterogeneous network (HetNet) scenario and that a transfer to idle mode is upcoming (as illustrated by steps 204 and 206), it may store parameters needed for connection setup towards the serving cell (as illustrated by step 208) before transfer to idle mode in step 210.

When a device in idle mode (step 212) detects that a transfer to active mode is upcoming (as illustrated by step 214), it may use stored connection setup parameters (e.g. the parameters stored in step 208) to attempt connection setup to a cell that is not a current camping cell when transferring to active mode in step 216. The parameters stored in step 208 may typically be discarded after completion of step 216.

An applicable heterogeneous network scenario (compare with step 204) may be defined in various ways. One suitable definition is that that the device is using the cell of the lower layer node as serving cell. Another suitable definition is that the device is using the cell of the lower layer node as serving cell and is located in a coverage zone (a so called link imbalance zone) where it is possible to communicate with a higher layer node and with a lower layer node, where a received signal strength from the lower layer node is less than a received signal strength from the higher layer node, and where a path loss between the device and the lower layer node is less than the path loss between the device and the higher layer node.

The higher layer node may provide a higher layer cell (e.g. a first cell, compare with coverage area 31 of FIGS. 1A, 1B and 1C) associated with a higher cell layer (e.g. a first cell layer, also referred to herein as a higher layer) of the heterogeneous network. The lower layer node may provide a lower layer cell (e.g. a second cell, compare with coverage area 21 of FIGS. 1A, 1B and 1C) associated with a lower cell layer (e.g. a second cell layer, also referred to herein as a lower layer) of the heterogeneous network. The higher layer node may also be referred to as an aggressor node or a macro node or source node and the lower layer node may also be referred to as a victim node or a pico node or target node.

Different methods are available for the wireless communication device to detect whether the wireless device is operating in a victim-aggressor scenario, e.g. the applicable heterogeneous network scenario of step 204. For example, the wireless communication device may receive an indication from a network node (typically another node than the aggressor node) identifying the aggressor network node. In some embodiments, the indication may be a piece of assistance data received from a serving eNodeB for handling interference and/or it may be a measurement resource restriction pattern indicating a subset of subframes with improved interference conditions. The wireless communication device may also determine that it is operating in a victim-aggressor scenario during a mobility event, e.g., a handover to a cell range expansion (CRE) zone or link imbalance zone. The wireless communication device may detect that the signal strength or quality of the signal is deteriorating and decide the deterioration is due to an aggressor. The wireless communication device may detect a victim-aggressor scenario by relying on network assistance or autonomously by blind detection. The wireless communication device may also detect a victim-aggressor scenario based on historical data stored on the device or based on the total interference measurements or interference measurements on specific time-frequency resources such as specific resource elements.

Thus, detection or determination of the applicable heterogeneous network scenario (step 204) may be performed according to any suitable known or future method. For example, the determination may comprise a determination of whether or not the device is configured with a restricted set of sub frames for measurements (e.g. an almost blank sub frame pattern or an MBSFN—multi-broadcast single frequency network—sub frame pattern, both defined in MeasSubframePattern of 3GPP LTE). Alternatively or additionally, received signal strength measurements of the lower and higher layer cells and comparisons between them may be used in the determination. Yet alternatively or additionally, the determination may comprise receiving explicit or implicit indications in signaling from the network (e.g. from the serving cell). Still alternatively or additionally, the determination may comprise comparing current location information with historical information (collected by the device itself and/or by other devices) associating locations with heterogeneous network scenarios. The current location information may be obtained via e.g. via Global Positioning System—GPS, finger printing based on neighbor cells (timing and/or signal conditions), etc.

Detection of an upcoming mode switch (steps 206 and 214) may be in accordance to any known or future suitable method. For example, detecting an upcoming mode switch may comprise a physical layer of the device receiving a mode change indication (e.g. a RRC message, such as a connection setup message for transfer to active mode and a connection release message for transfer to idle mode) from a higher operational layer (e.g. a layer 3 of the operational system interconnection model) of the device. The mode switch may be triggered by the device or by the network (or network node) and communicated to the device, in accordance to any known or future suitable method.

In some embodiments, the detection of an upcoming transfer to idle mode involves monitoring network timers related to idle mode transitions and follows principles according to the signaling protocol for the applicable communication system.

In some embodiments, the detection of an upcoming transfer to active mode involves determining whether the device has data packets in a transmission queue and/or determining whether or not a paging signal is received from the network (e.g. camping cell).

The parameters needed for connection setup that are stored in step 208 and used in step 216 may be any known or future suitable connection setup parameters. For example, these parameters may comprise cell configuration parameters and/or random access parameters. Example connection setup parameters include: a carrier frequency, a cell identity (e.g. physical cell identity), one or more random access channel (RACH) signatures, and one or more random access channel (RACH) timing parameters.

In some embodiments, one or more of the connection setup parameters may be received in form of broadcast information, e.g. read from a master information block (MIB) and/or a system information block (e.g. SIB1, SIB2). Alternatively or additionally, one or more of the connection setup parameters may be received in dedicated signaling from the network (e.g. the serving cell) to the device.

The parameters may be acquired in connection with the storing step 208 (i.e. when either or both of the detection steps 204 and 206 have been completed). Alternatively, the parameters are acquired before completion of the detection steps 204 and 206 as part of general active mode operation (202).

As mentioned before, heterogeneous network cell selection procedures are typically not equally defined for idle mode and active mode. In some applications heterogeneous network cell selection procedures are not defined at all for idle mode. This results in that the device typically camps on the cell with highest received signal strength. Thus, the transfer to idle mode (step 212) may typically comprise starting to camp on a higher layer cell (at least when any of the applicable heterogeneous network scenario definitions above are applied). If the lower layer cell was used as serving cell in active mode and the device is in the link imbalance zone, the transfer to idle mode comprises a cell switch.

In idle mode (step 212), the device may typically perform some basic measurements associated with the lower layer node even if the higher layer cell is used as camping cell and even though the received signal strength of the lower layer cell is below a standardized level for cell monitoring in idle mode. The measurements may, for example, comprise synchronization measurements (e.g. cell timing measurements), signal strength measurements (e.g. reference signal received power—RSRP—measurements), and/or signal quality measurements (e.g. reference signal received quality—RSRQ—measurements). The measurements may, for example, be performed at regular time intervals (e.g. around every 50 ms).

According to some embodiments, the transfer to active mode in step 216 may comprise determining whether or not there are any stored connection setup parameters to use (as illustrated by step 218). If there are no stored connection setup parameters (NO-path out from step 218), connection setup is directly attempted towards the camping cell (as illustrated by step 224). If there are stored connection setup parameters (YES-path out from step 218), the mobility of the device may be evaluated (as illustrated by step 220, compare with the situations in FIGS. 1A, 1B and 1C).

The evaluation of step 220 may comprise determining whether or not it is likely that they are still valid, i.e. whether or not the device is still in the coverage area of the cell that the stored connection setup parameters are associated with. To this end, the evaluation of step 220 may comprise determining whether one or more non-mobility conditions are fulfilled. The non-mobility conditions may, for example, comprise one or more of:

- no cell re-selection being made in the idle mode,
- a received signal strength of the lower layer cell being above a signal strength threshold (the threshold may be static or dynamic, e.g. depending on a received signal strength of the higher layer cell),
- a received signal strength decrease of the lower layer cell during the idle mode being below a signal strength difference threshold,
- a received signal strength increase of the higher layer cell during the idle mode being below a signal strength difference threshold (same or different threshold as for the decrease of the lower layer cell),
- a received signal strength decrease of the higher layer cell during the idle mode being below a signal strength difference threshold (same or different threshold as for the decrease of the lower layer cell and/or for the increase of the higher layer cell),
- the lower layer cell not being lost,
- a time elapsed since the transfer to idle mode being less than a predetermined or dynamic time threshold, and
- a change in geographical location (e.g. based on Global Positioning System—GPS, finger printing based on neighbor cells (timing and/or signal conditions), etc.) during the idle mode being below a location indication difference threshold.

Alternatively or additionally, the non-mobility condition may comprise a time in idle mode being less than an idle time threshold.

If it is not likely, as determined by the non-mobility condition(s) not being fulfilled, that the device is still in the coverage area of the cell that the stored connection setup parameters are associated with (NO-path out from step 220), connection setup is directly attempted towards the camping cell (as illustrated by step 224). If it is likely, as determined by the non-mobility condition(s) being fulfilled, that the device is still in the coverage area of the cell that the stored connection setup parameters are associated with (YES-path out from step 220), connection setup is attempted towards the cell that the stored connection setup parameters are associated with (as illustrated by step 222), which cell may typically differ from the camping cell in idle mode e.g. in HetNet scenarios.

The connection setup attempt of step 222 may typically comprise transmitting a random access (RA) signal on the random access channel (RACH) associated with the lower layer cell (i.e. cell that the stored connection setup parameters are associated with) at a time instant determined by the stored connection setup parameters. Thereafter, completion of the connection setup procedure may be in accordance with any suitable known or future methods.

The connection setup attempt of step 222 may or may not comprise first performing a cell re-selection from the higher layer cell to the lower layer cell. In one example, the higher layer cell and the lower layer cell belong to the same location area (LA). Typically, a location area comprises several cells and is the granularity used for the network to locate a device in idle mode (i.e. paging messages from the network to an idle device are forwarded to all cells of a location area). Therefore, the connection setup attempt does not necessarily comprise first performing a cell re-selection to the lower layer cell in this example.

If the connection setup of step 222 towards the cell that the stored connection setup parameters are associated with fails (after one or more attempts), connection setup towards the camping cell (compare with step 224) may be attempted as a fallback solution according to some embodiments.

In some embodiments, the evaluation of step 220 may be omitted and connection setup is always attempted towards the cell that the stored connection setup parameters are associated with (as illustrated by step 222) if there are stored connection setup parameters (YES-path out from step 218).

Figure 2B:
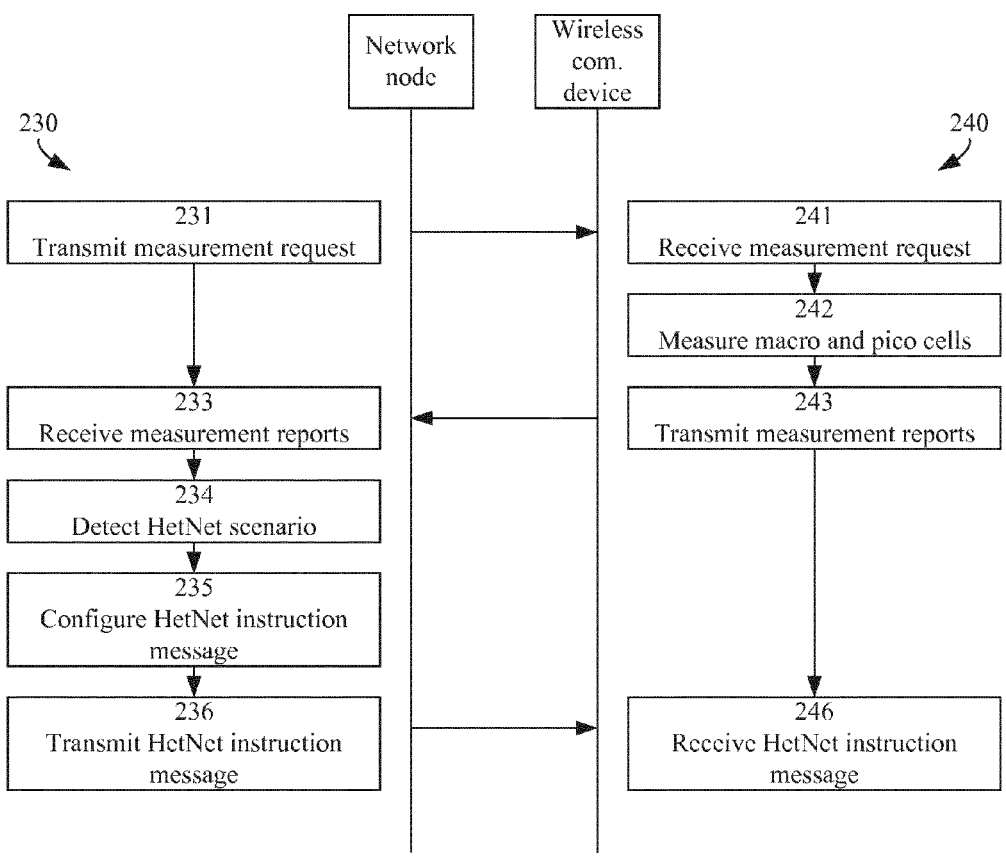
FIG. 2B is a flowchart illustrating example method steps according to some embodiments.

FIG. 2B illustrate an example method 230 of a network node and, an example method 240 of a wireless communication device, and corresponding signaling between the network node and the device. For a device in active mode, the method 240 may be implemented as part of steps 202 and/or 204 of FIG. 2A. For a device in idle mode, the method 240 may be implemented as part of step 212 of FIG. 2A. The network node executing the example method 230 may typically be the serving node in the former case and the camping node in the latter case.

In this embodiment, the network node configures the device to perform measurements (e.g. signal strength measurements) by transmitting a measurement request in step 231 which is received by the device in step 241. Typically, the configuration instructs the device to perform measurements on both higher (e.g. aggressor, source, etc.) and lower (e.g. victim, target, etc.) layer cells. The device performs the measurements in step 242 and transmits corresponding measurement reports in step 243. The measurement reports are received by the network node in step 233.

Based on the measurement reports, the network node determines, in step 234, that the device is in an applicable heterogeneous network scenario (see, for example, the definition of link imbalance zones above). In some embodiments, the network node may determine that the device is in an applicable heterogeneous network scenario in other ways (e.g. geographical position or a recent history of frequent handovers) than via measurement reports.

The network node configures a heterogeneous network instruction message in step 235. The heterogeneous network instruction message is transmitted by the network node in step 236 and received by the device in step 246. The device then acts accordingly.

If the procedures of FIG. 2B are performed when the device is in active mode, reception of the heterogeneous network instruction message in step 256 may, according to some embodiments, correspond to the detection step 204 of FIG. 2A, and the heterogeneous network instruction message may comprise an instruction to store the connection setup parameters when an upcoming mode transfer is detected.

If the procedures of FIG. 2B are performed when the device is in idle mode, the heterogeneous network instruction message may comprise the connection setup parameters (e.g. RACH information) to be used when an upcoming mode transfer is detected. These parameters are then stored until they are to be used (similarly to step 208 of FIG. 2A).

Generally, the stored parameters may, according to some embodiments, be stored until they are to be used or until discarding of the parameters is triggered. The trigger may be initiated by the device or by the network (or a network node). For example, a timer (of the network or of the device) may start running at the time or storing or at the time of transfer to idle mode and when the time reaches a certain value, the stored parameters are discarded. In another example, a related event (e.g. a measurement event) may trigger the discarding of stored parameters. Combinations of the above are also possible. For example, the parameters are discarded when they have been used, when a related event occurs, or when a timer reaches a certain value—whichever occurs first.

The measurement request and/or the heterogeneous network instruction message may be transmitted in broadcast information (e.g. a SIB field) or in dedicated signaling as applicable.

When the approach explained in connection to FIGS. 2A and/or 2B is applied, the device typically connects directly to the suitable cell according to the heterogeneous network scenario applicable. Hence, there are no additional handovers due to heterogeneous network scenarios performed directly after transfer to active mode and the overall amount of handover signaling is reduced. Thus, there will be significantly less handover signaling during mode transitions in heterogeneous network deployments, which in turn may reduce the load in the backhaul and over the radio interface. Furthermore, since the random access is typically made towards the cell requiring the lowest device transmission power, the interference in the uplink may also be decreased.

Figure 3:
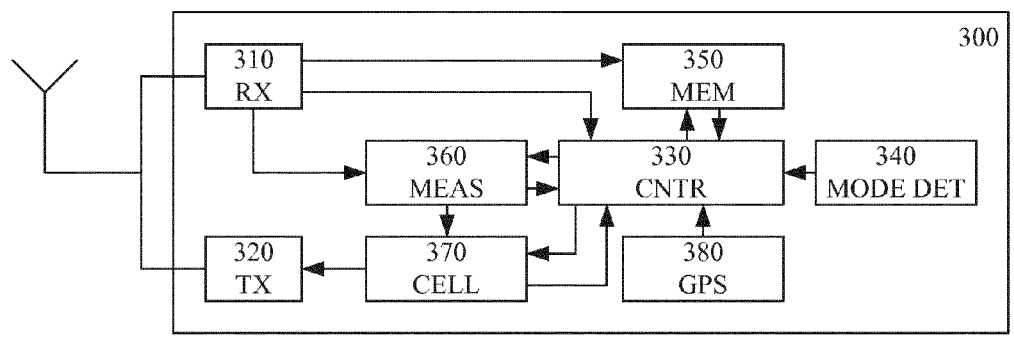
FIG. 3 is a block diagram illustrating an example arrangement according to some embodiments.

FIG. 3 illustrate an example arrangement 300 according to some embodiments. The example arrangement may, for example, be implemented within a wireless communication device and may be adapted to perform any of the methods as described in connection with FIGS. 2A and 2B. The example arrangement 300 comprises a controller (CNTR)

330, a mode detector (MODE DET) 340, a storage unit (MEM) 350, and a cell management unit (CELL) 370.

The mode detector 340 is adapted to detect an upcoming transfer to the idle mode (compare with step 206 of FIG. 2A) and to detect an upcoming transfer to the active mode (compare with step 214 of FIG. 2A). The mode detector 340 is operatively connected to the controller 330 and forwards the upcoming mode transfer detections to the controller.

The controller 330 is adapted to detect that the device is in an applicable heterogeneous network scenario (compare with step 204 of FIG. 2A). For this purpose, the controller 330 is operatively connected to a receiver (RX) 310 and possibly to a signal strength measurement unit (MEAS) 360.

The controller 330 is also adapted to cause the storage unit 350 to store connection setup parameters of the serving cell (compare with step 208 of FIG. 2A) in response to detecting the device is in an applicable heterogeneous network scenario and receiving an indication of upcoming transfer to idle mode from the mode detector 340. For this purpose, the controller 330 is operatively connected to the storage unit 350 and the storage unit 350 is operatively connected to the receiver 310.

Furthermore, the controller 330 is adapted to cause the wireless communication device to transfer to the idle mode (compare with step 210 of FIG. 2A) in response to receiving the indication of upcoming transfer to idle mode from the mode detector 340. For this purpose, the controller 330 is operatively connected to the cell management unit 370.

The cell management unit 370 is adapted to select the camping cell in accordance with idle mode procedures of the applicable system. For example, the cell management unit 370 may be adapted to select the cell having highest received signal strength as the camping cell. For collecting received signal strength measurements, the cell management unit may be operatively connected to the signal strength measurement unit 360 which is adapted to measure signal strength of the lower layer cell and/or the higher layer cell, and is in turn operatively connected to the receiver 310. Thus, transferring to idle mode by the wireless communication device may comprise the cell management unit performing a cell re-selection.

Furthermore, the controller 330 is adapted to cause the wireless communication device to transfer to the active mode (compare with step 216 of FIG. 2A) in response to receiving the indication of upcoming transfer to active mode from the mode detector 340. Transferring to the active mode may comprise setting up a connection to a cell of the heterogeneous cellular communication network based on the stored connection setup parameters as has been explained above. For this purpose, the controller 330 is operatively connected to the storage unit 350 and operatively connected (via the cell management unit 370) to a transmitter (TX) 320 adapted to transmit a random access message based on the stored parameters.

The controller 330 may be further adapted to determine if a non-mobility condition is fulfilled as explained above in connection to FIG. 2A. For this purpose, the controller 330 may be operatively connected to the signal strength measurement unit 360, to the cell management unit 370, and/or to a positioning unit (e.g. a GPS) 380 adapted to provide location indicators.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a tablet, a computer, a notebook, a modem, a sensor, a machine-type communication device, or a mobile gaming device.

Network nodes as referred to herein may, for example, be a base station, a NodeB, an eNodeB, or any other suitable network node.

Figure 4:
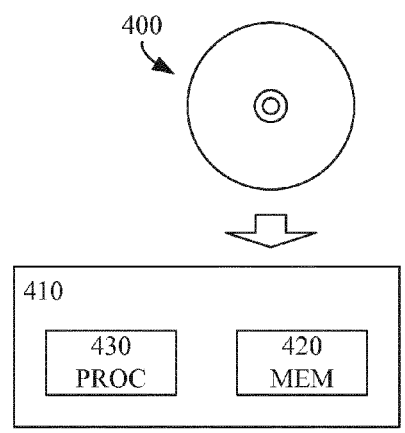
FIG. 4 is a schematic drawing illustrating a computer readable medium according to some embodiments.

According to some embodiments, a computer program product comprises a computer readable medium such as, for example, a diskette, a CD-ROM, a USB-stick, a plug-in card, or an embedded drive. The computer readable medium (e.g. the CD-ROM 400 illustrated in FIG. 4) may have stored thereon a computer program comprising program instructions. The computer program may be loadable into a data-processing unit 430, which may, for example, be comprised in a mobile terminal 410. When loaded into the data-processing unit 430, the computer program may be stored in a memory 420 associated with or integral to the data-processing unit 430. According to some embodiments, the computer program may, when loaded into and run by the data-processing unit, cause the data-processing unit to execute method steps according to, for example, the method shown in FIG. 2A and/or FIG. 2B.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps (e.g. steps 204 and 206 of FIG. 2A) may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A connection setup method of a wireless communication device configured to be operated in a heterogeneous cellular communication network, wherein the heterogeneous cellular communication network comprises at least a first cell and a second cell, the first and second cell being respectively associated with a first cell layer and a second cell layer of the heterogeneous cellular communication network, and wherein the wireless communication device is configured to use a serving cell associated with the first cell layer or the second cell layer when the wireless communication device is in an active mode, and to use a camping cell associated with the first cell layer when the wireless communication device is in an idle mode, the method comprising:

the wireless communication device performing:
detecting, when the wireless communication device is in the active mode and uses the second cell as the serving cell, that the serving cell is associated with the second cell layer;
detecting an upcoming transfer to the idle mode;
storing connection setup parameters of the second cell in response to detecting the upcoming transfer to the idle mode;
transferring to the idle mode, wherein transferring comprises selecting the first cell as the camping cell;
detecting an upcoming transfer to the active mode; and
transferring to the active mode, wherein transferring comprises setting up a connection to a cell of the heterogeneous cellular communication network based on the stored connection setup parameters of the second cell.

2. The method of claim 1 wherein setting up a connection to the cell of the heterogeneous cellular communication network based on the stored connection setup parameters of the second cell comprises:
connecting to the second cell as the serving cell using the stored connection setup parameters of the second cell.

3. The method of claim 1 wherein setting up the connection to the cell of the heterogeneous cellular communication network based on the stored connection setup parameters of the second cell comprises:
determining if a non-mobility condition is fulfilled;
connecting to the second cell as the serving cell using the stored connection setup parameters of the second cell if the non-mobility condition is fulfilled; and
connecting to a cell associated with the first cell layer as the serving cell if the non-mobility condition is not fulfilled.

4. The method of claim 3 wherein connecting to a cell associated with the first cell layer as the serving cell comprises connecting to the first cell as the serving cell.

5. The method of claim 3 further comprising, after transferring to the idle mode and before transferring to the active mode:
performing re-selection from the first cell to a third cell as the camping cell, wherein the third cell is associated with the first cell layer, and wherein connecting to a cell associated with the first cell layer as the serving cell comprises connecting to the third cell as the serving cell.

6. The method of any of claim 3 wherein determining if a non-mobility condition is fulfilled comprises at least one of:
determining if no cell re-selection has been made after transferring to the idle mode and before transferring to the active mode;
determining if a signal strength value of the second cell is above a signal strength threshold;
determining if a difference between first and second signal strength values of the first cell is below a signal strength difference threshold, the first and second signal strength values measured at different time instants after transferring to the idle mode and before transferring to the active mode; and
determining if a difference between first and second location indications of the wireless communication device is below a location indication difference threshold, the first and second location indications associated with different time instants after transferring to the idle mode and before transferring to the active mode.

7. The method of any of claim 1 wherein detecting, when the wireless communication device is in the active mode and uses the second cell as the serving cell, that the serving cell is associated with the second cell layer comprises at least one of:
detecting that the wireless communication device is configured with a restricted measurement pattern;
detecting that a current signal strength value of the second cell is below a current signal strength value of a strongest cell associated with the first cell layer;
receiving a heterogeneous network scenario indication from the second cell; and
detecting that a current location indication is comprised among stored location indications associated with a heterogeneous network scenario.

8. The method of any of claim 1 further comprising, after transferring to the idle mode and before transferring to the active mode:
performing measurements on the second cell.

9. A connection setup method of a wireless communication device configured to be operated in a heterogeneous cellular communication network, wherein the heterogeneous cellular communication network comprises at least a first cell and a second cell, the first and second cell being respectively associated with a first cell layer and a second cell layer of the heterogeneous cellular communication network, and wherein the wireless communication device is configured to use a serving cell associated with the first cell layer or the second cell layer when the wireless communication device is in an active mode, and to use a camping cell associated with the first cell layer when the wireless communication device is in an idle mode, the method comprising:

the wireless communication device performing:
detecting, when the wireless communication device is in the idle mode and uses the first cell as the camping cell, an upcoming transfer to the active mode;
determining if connection setup parameters of the second cell are stored; and
transferring to the active mode, wherein transferring comprises:
if it was determined that connection setup parameters of the second cell are stored, connecting to the second cell as the serving cell using the stored connection setup parameters of the second cell; and
connecting to the first cell as the serving cell otherwise.

10. The method of claim 9 further comprising, before detecting the upcoming transfer to the active mode:
receiving a heterogeneous network instruction message from a cell of the heterogeneous cellular communication network, the heterogeneous network instruction message comprising connection setup parameters of the second cell; and
storing the connection setup parameters of the second cell.

11. A nontransitory computer readable medium having thereon a computer program comprising program instructions, the computer program being loadable into a data-processing unit and configured to cause execution of a connection setup method when the computer program is run by the data-processing unit, wherein the method is of a wireless communication device configured to be operated in a heterogeneous cellular communication network, wherein the heterogeneous cellular communication network comprises at least a first cell and a second cell, the first and second cell being respectively associated with a first cell layer and a second cell layer of the heterogeneous cellular communication network, and wherein the wireless communication device is configured to use a serving cell associated with the first cell layer or the second cell layer when the wireless communication device is in an active mode, and to use a camping cell associated with the first cell layer when the wireless communication device is in an idle mode, and wherein the method comprises:

the wireless communication device:
detecting, when the wireless communication device is in the active mode and uses the second cell as the serving cell, that the serving cell is associated with the second cell layer;
detecting an upcoming transfer to the idle mode;
storing connection setup parameters of the second cell in response to detecting the upcoming transfer to the idle mode;
transferring to the idle mode, wherein transferring comprises selecting the first cell as the camping cell;
detecting an upcoming transfer to the active mode; and
transferring to the active mode, wherein transferring comprises setting up a connection to a cell of the heterogeneous cellular communication network based on the stored connection setup parameters of the second cell.

12. A connection setup arrangement of a wireless communication device, wherein the wireless communication device is configured to be operated in a heterogeneous cellular communication network, wherein the heterogeneous cellular communication network comprises at least a first cell and a second cell, the first and second cell being respectively associated with a first cell layer and a second cell layer of the heterogeneous cellular communication network, and wherein the wireless communication device is configured to use a serving cell associated with the first cell layer or the second cell layer when the wireless communication device is in an active mode, and to use a camping cell associated with the first cell layer when the wireless communication device is in an idle mode, the arrangement comprising:

a controller;
a mode detector;
a memory; and
a cell manager,
wherein:
the controller is configured to detect, when the wireless communication device is in the active mode and use the second cell as the serving cell, that the serving cell is associated with the second cell layer;
the mode detector is configured to detect an upcoming transfer to the idle mode;
the controller is configured to, when it has detected that the serving cell is associated with the second cell layer, cause the memory to store connection setup parameters of the second cell in response to the mode detector detecting the upcoming transfer to the idle mode;
the controller is configured to cause the wireless communication device to transfer to the idle mode;
the cell manager is configured to perform the transferring to the idle mode by selecting the first cell as the camping cell;
the mode detector is configured to detect an upcoming transfer to the active mode; and
the controller is configured to cause the wireless communication device to transfer to the active mode, wherein transferring comprises setting up a connection to a cell of the heterogeneous cellular communication network based on the stored connection setup parameters of the second cell.

13. The arrangement of claim 12 wherein the controller is further configured to, when causing the wireless communication device to transfer to the active mode:
determine if a non-mobility condition is fulfilled;
cause the cell manager to select the first cell as the serving cell if the non-mobility condition is fulfilled; and
cause cell manager to select a cell associated with the first cell layer as the serving cell if the non-mobility condition is not fulfilled.

14. The arrangement of claim 13 further comprising a signal strength measurer configured to measure signal strengths of at least one of the first and second cell and wherein the controller is configured to determine if a non-mobility condition is fulfilled by determining at least one of:
if a signal strength value of the second cell is above a signal strength threshold; and
if a difference between first and second signal strength values of the first cell is below a signal strength difference threshold, the first and second signal strength values measured at different time instants after transferring to the idle mode and before transferring to the active mode.

15. The arrangement of claim 13 further comprising a positioner configured to provide first and second location indicators of the wireless communication device and wherein the controller is configured to determine if a non-mobility condition is fulfilled by determining if a difference between the first and second location indications is below a location indication difference threshold, the first and second location indications associated with different time instants after transferring to the idle mode and before transferring to the active mode.

16. The arrangement of any of claim 13 wherein the controller is configured to determine if a non-mobility condition is fulfilled by determining if no cell re-selection has been made after transferring to the idle mode and before transferring to the active mode.

17. A wireless communication device comprising the arrangement of claim 12.

* * * * *